US008786562B2

(12) United States Patent
Ishizuka et al.

(10) Patent No.: US 8,786,562 B2
(45) Date of Patent: Jul. 22, 2014

(54) MOBILE ELECTRONIC DEVICE, CONTROL METHOD, AND STORAGE MEDIUM STORING CONTROL PROGRAM

(75) Inventors: Yuka Ishizuka, Yokohama (JP); Tsuneo Miyashita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 223 days.

(21) Appl. No.: 13/304,446

(22) Filed: Nov. 25, 2011

(65) Prior Publication Data

US 2012/0133604 A1 May 31, 2012

(30) Foreign Application Priority Data

Nov. 26, 2010 (JP) ................................. 2010-264384

(51) Int. Cl.
*G06F 3/041* (2006.01)
(52) U.S. Cl.
USPC .......................................... 345/173; 345/1.1
(58) Field of Classification Search
USPC ........... 345/1.1, 173–177, 204, 659; 455/466, 455/566
See application file for complete search history.

(56) References Cited

U.S. PATENT DOCUMENTS 8,326,368 B2 * 12/2012 Sawada et al. ................ 455/566
2010/0085382 A1 * 4/2010 Lundqvist et al. ............ 345/659

FOREIGN PATENT DOCUMENTS

JP 2009-164794 A 7/2009

* cited by examiner

*Primary Examiner* — Andrew Sasinowski
(74) *Attorney, Agent, or Firm* — Lowe Hauptman & Ham, LLP

(57) ABSTRACT

According to an aspect, a mobile electronic device includes a first housing having a first display unit, a second housing having a second display unit, a form detector, and a control unit. The form detector detects a first form in which the second display unit is covered with the first housing while the first display unit is exposed to the outside and a second form in which the first display unit and the second display unit are exposed to the outside. A control unit cause objects for activating a function to be displayed on the first display unit and on the second display unit in an associated manner in conjunction with a change in form detected by the form detector.

4 Claims, 12 Drawing Sheets

FIG.11

| ID | CORRESPONDING FUNCTION | PICTOGRAM | ADDITIONAL INFORMATION | DISPLAY LOCATION ||
|---|---|---|---|---|---|
| | | | | UPPER SCREEN | LOWER SCREEN |
| 1 | WEB BROWSER PROGRAM | browser.ico | WEB BROWSER | 1 | 1 |
| 2 | MAIL PROGRAM | mail.ico | ELECTRONIC MAIL | 2 | 2 |
| 3 | MAIL PROGRAM (MAIL COMPOSITION) | mailedit.ico | ELECTRONIC MAIL (MAIL COMPOSITION) | 3 | - |

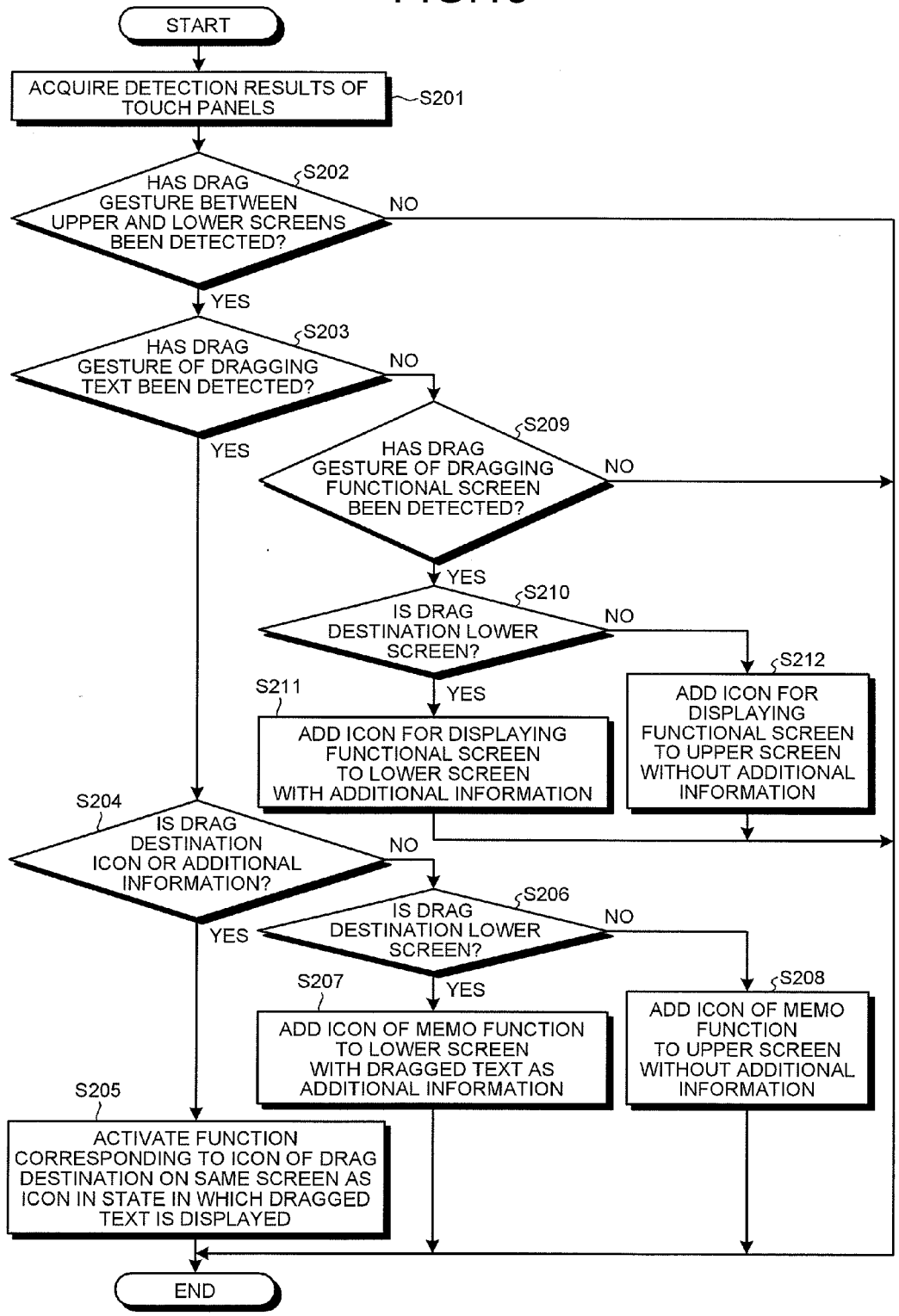

MOBILE ELECTRONIC DEVICE, CONTROL METHOD, AND STORAGE MEDIUM STORING CONTROL PROGRAM

This application claims priority from Japanese Application No. 2010-264384, filed on Nov. 26, 2010, the content of which is incorporated by reference herein in its entirety.

BACKGROUND

1. Technical Field

The present disclosure relates to a mobile electronic device, a control method, and a storage medium storing therein a control program.

2. Description of the Related Art

Recently, a touch panel is widely used in order to enable an intuitive operation and achieve a compact electronic device without requiring a physically large area for an user interface, such as a keyboard. Japanese Patent Application Laid-open No. 2009-164794 proposes a mobile phone terminal that includes two touch panels and is changed between an open state in which the two touch panels are exposed and a closed state in which only one of the touch panels is exposed. The mobile phone terminal calls back to the caller, who made a call to the mobile phone terminal in the open state, at the time of the form change from the open state to the closed state.

According to the above-discussed art, the user's convenience on an operation related to voice communication may improve. However, in the above-discussed art, the user's convenience on an operation related to the other functions provided by the mobile electronic device is not considered. Recent mobile electronic devices have a rich diversity of functions, and thus there is a need to improve the user's convenience on an operation method for using various functions as well as an operation method for executing voice communication.

SUMMARY

According to an aspect, a mobile electronic device includes a first housing having a first display unit, a second housing having a second display unit, a form detector, and a control unit. The form detector detects a first form in which the second display unit is covered with the first housing while the first display unit is exposed to the outside and a second form in which the first display unit and the second display unit are exposed to the outside. A control unit cause objects for activating a function to be displayed on the first display unit and on the second display unit in an associated manner in conjunction with a change in form detected by the form detector.

According to an aspect, a control method controls a mobile electronic device includes a first housing having a first display unit and a second housing having a second display unit. The control method includes: detecting that the mobile electronic device has changed from a first form in which the second display unit is covered with the first housing while the first display unit is exposed to the outside to a second form in which the first display unit and the second display unit are exposed to the outside; and causing a first character string, which corresponds to a first icon displayed on the first display unit, to be displayed in the second display unit when it is detected that the mobile electronic device has changed to the second form.

According to an aspect, a non-transitory storage medium stores a control program. A control program causes, when executed by a mobile electronic device including a first housing having a first display unit and a second housing having a second display unit, the mobile electronic device to execute: detecting that the mobile electronic device has changed from a first form in which the second display unit is covered with the first housing while the first display unit is exposed to the outside to a second form in which the first display unit and the second display unit are exposed to the outside; and causing a first character string, which corresponds to a first icon displayed in the first display unit, to be displayed in the second display unit when it is detected that the mobile electronic device has changed to the second form.

BRIEF DESCRIPTION OF THE DRAWINGS

FIG. 11 is a diagram illustrating an example of icon data;

FIG. 13 is a flowchart illustrating a processing procedure when a drag gesture between upper and lower screens is detected.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone terminal is used to explain as an example of the mobile electronic device, however, the present invention is not limited to the mobile phone terminals. Therefore, the present invention can be applied to any type of devices provided with a touch panel, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
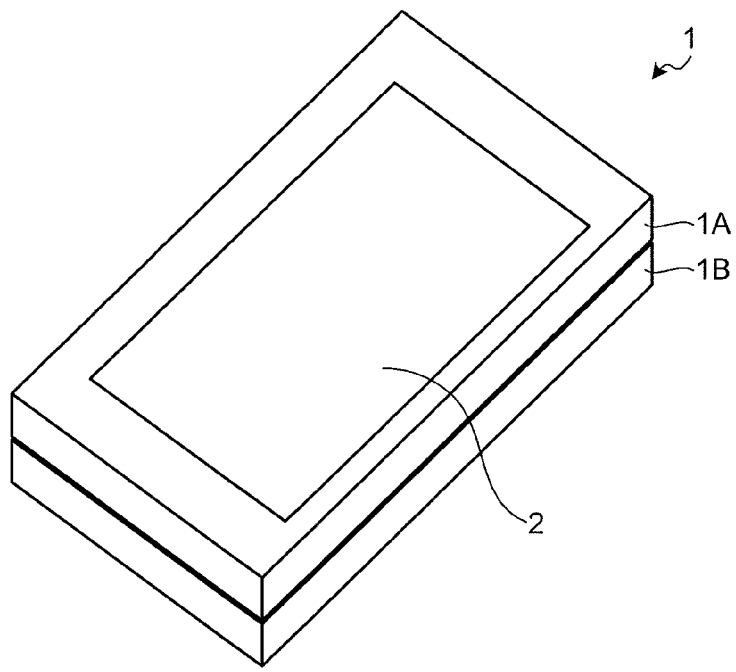
FIG. 1 is a perspective view of a mobile phone terminal in a first form.
Figure 2:
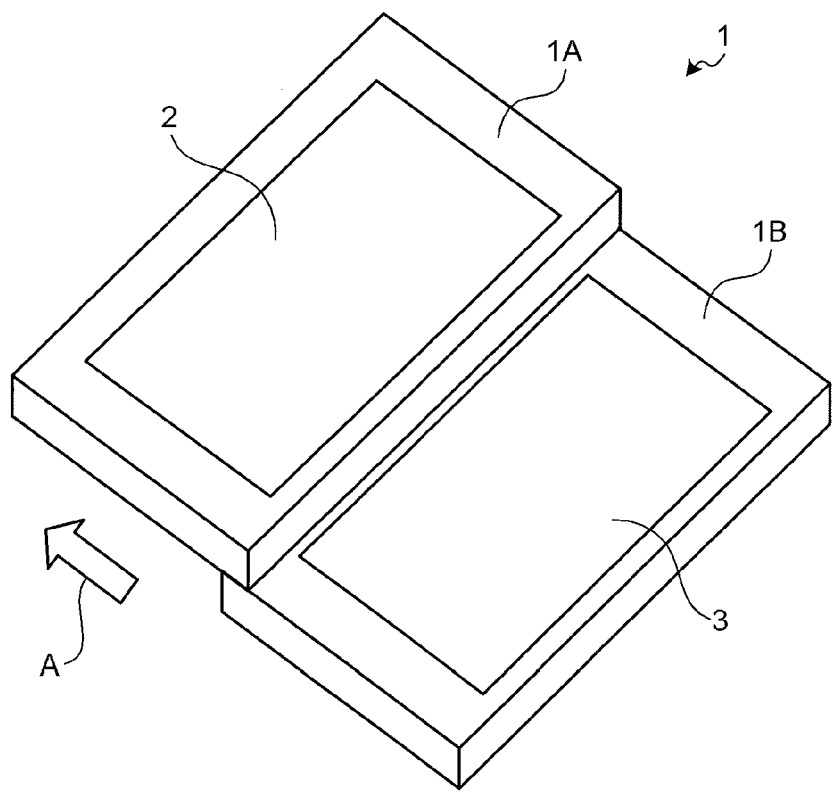
FIG. 2 is a perspective view of a mobile phone terminal in a second form.

First, an overall configuration of a mobile phone terminal 1 as an embodiment of the mobile electronic device according to the present invention will be explained below with reference to FIG. 1 and FIG. 2. FIG. 1 is a perspective view of the mobile phone terminal 1 in a first form, and FIG. 2 is a perspective view of the mobile phone terminal 1 in a second form. The mobile phone terminal 1 includes a first housing 1A and a second housing 1B. The first housing 1A is configured so as to be slidable relative to the second housing 1B in the direction of arrow A.

The first housing 1A includes a touch panel 2 on the side facing away from the second housing 1B. The second housing 1B includes a touch panel 3 on the side that faces the first housing 1A. The touch panel 2 and the touch panel 3 display characters, graphics, images, and so on, and detect various operations performed by a user on the touch panel using his/her finger(s), a pen, a stylus or the like (in the description herein below, for the sake of simplicity, it is assumed that the user touches the touch panels with his/her fingers). The touch panel 3 is covered by the first housing 1A in the first form in which the first housing 1A and the second housing 1B substantially overlap each other, and is exposed to the outside in the second form in which the first housing 1A slides in the direction of arrow A.

The first form is suitable for the user to carry the mobile phone terminal 1, and even in this form, the user can refer to information displayed on the touch panel 2 and operate the touch panel 2 with the finger, to input information or commands. The second form is suitable for the user to use the mobile phone terminal 1, and thus the user can refer to more information using both the touch panel 2 and the touch panel 3.

In the following description, the touch panel 2 that is always exposed to the outside may be referred to as an upper screen 2, and the touch panel 3 that is covered with the first housing 1A in the first form and exposed to the outside in the second form may be referred to as a lower screen 3.

Figure 3:
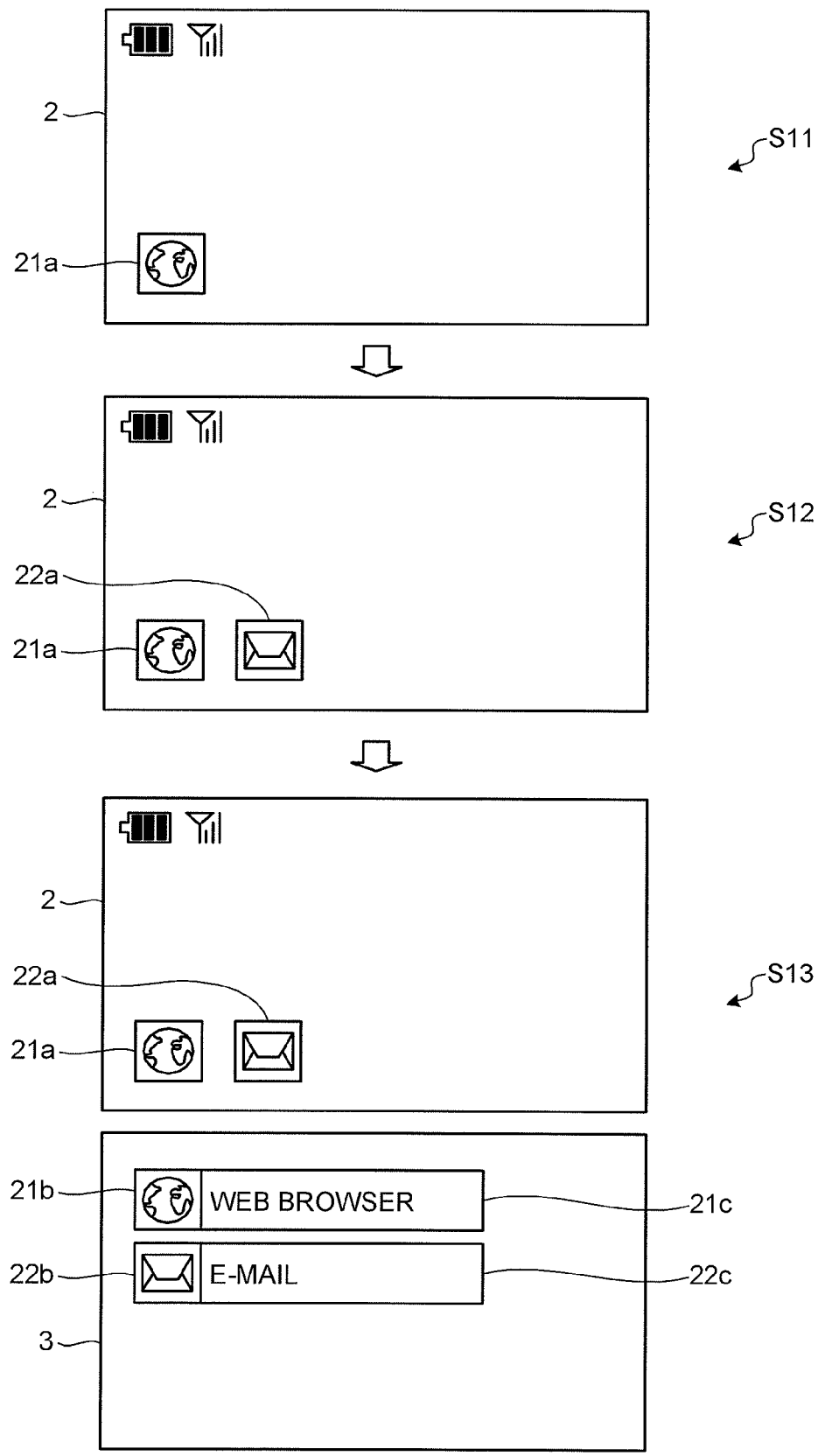
FIG. 3 is a diagram illustrating an example of adding an icon to a lower screen in conjunction with a change in the form of a mobile phone terminal.
Figure 4:
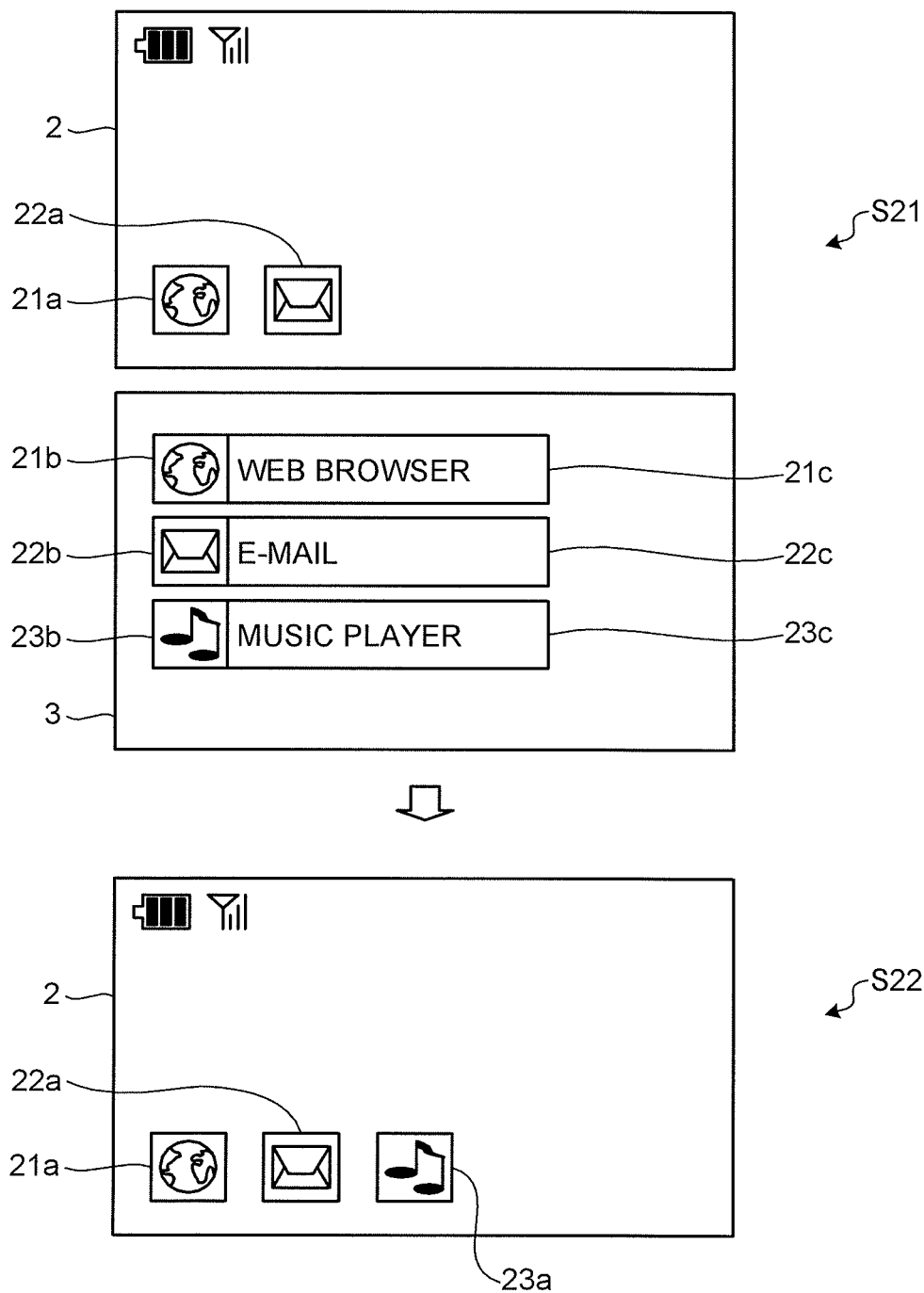
FIG. 4 is a diagram illustrating an example of adding an icon to an upper screen in conjunction with a change in the form of a mobile phone terminal.

Next, a way of controlling the display of an icon in conjunction with a change in the form of the mobile phone terminal 1 will be described with reference to FIGS. 3 and 4. FIG. 3 is a diagram illustrating an example of adding an icon to the lower screen 3 in conjunction with a change in the form of the mobile phone terminal. FIG. 4 is a diagram illustrating an example of adding an icon to the upper screen 2 in conjunction with a change in the form of the mobile phone terminal.

At step S11 illustrated in FIG. 3, the mobile phone terminal 1 is in the first form, and a standby screen with an icon 21a arranged thereon is displayed on the upper screen 2. The icon arranged on the standby screen is associated with a specific function. When the user performs a tap gesture of tapping the icon, the mobile phone terminal 1 activates a function corresponding to the tapped icon. For example, the icon 21a may be associated with a web browsing function. When the tap gesture of tapping the icon 21a is performed, the mobile phone terminal 1 activates the web browsing function. The "tap" refers to a gesture of briefly touching a touch panel or a touch sensor, e.g., with a finger, and releasing the finger therefrom.

As used herein, a "standby screen" is a screen in a standby state awaiting incoming and outgoing calls, or a screen in a standby state awaiting activation of an application program. In other words, the "standby screen" is a screen displayed before changing to another screen corresponding to any one of various functions provided by the mobile phone terminal 1. The standby screen is sometimes called, for example, "initial screen", "desktop", "home screen", or "wallpaper". In the example illustrated in FIG. 3, a plain screen is displayed as the standby screen, however, image data or animation data may be displayed as the standby screen. Moreover, a dynamically changing portion like a calendar and a clock may be included as a part of the standby screen.

At step S12, let us assume that the user performs a predetermined operation to add an icon 22a to the upper screen 2. The icon 22a is associated with an E-mail function. When the tap gesture of tapping the icon 22a is performed, the mobile phone terminal 1 activates the E-mail function. For example, the predetermined operation refers to an operation of displaying a menu by performing a long tap gesture of keep pressing the standby screen down with a finger for a predetermined time period or longer and then selecting an item corresponding to the E-mail function from among items of the menu.

It is assumed that after the icon 22a is added to the upper screen 2, the user switches the form of the mobile phone terminal 1 from the first form to the second form at step S13. In this case, an icon 21b and additional information 21c are arranged on the standby screen displayed on the lower screen 3 in association with each other. In addition, an icon 22b and additional information 22c are also arranged on the standby screen displayed on the lower screen 3 in association with each other.

The icon 21b is associated with the web browsing function and has the same external appearance as the icon 21a. The additional information 21c is information displayed in association with the icon 21b, and in this case, a text string representing a function associated with the icon 21b is displayed. The icon 22b is associated with the E-mail function and has the same external appearance as the icon 22a. The additional information 22c is information displayed in association with the icon 22b, and in this case, a text string representing a function associated with the icon 22b is displayed.

When the tap gesture of tapping the icon 21b or the additional information 21c is performed, the mobile phone terminal 1 activates the web browsing function. When the tap gesture of tapping the icon 22b or the additional information 22c is performed, the mobile phone terminal 1 activates the E-mail function.

Here, it should be noted that the mobile phone terminal 1 adds the icon 22b and the additional information 22c to the lower screen 3 as the form of the mobile phone 1 switches from the first form to the second form at step S13. That is, when the form of the mobile phone 1 has been switched from the first form to the second form, if a combination of an icon and additional information corresponding to an icon arranged on the standby screen of the upper screen 2 is not arranged on the standby screen of the lower screen 3, the mobile phone terminal 1 adds the combination of the icon and the additional information to the standby screen of the lower screen 3. For example, an icon and the corresponding additional information are added, in which the icon has the same appearance as an icon arranged on the upper screen 2 and the corresponding additional information is a text string representing the function of the corresponding icon.

By performing the above control, when the user switches the form of the mobile phone terminal 1 from the first form to the second form, the icon corresponding to the icon arranged on the upper screen 2 is arranged on the lower screen 3 along with the text string describing the function. A description text string previously embedded in a program for implementing the function may be extracted as the text string describing the function, or the text string for describing the function may be input by the user.

The icon has an external appearance designed to make the corresponding function easily understood. However, elderly people, for example, who are not familiar with dealing with an information device may feel it is difficult to infer the function of an icon from the external appearance of the icon. By displaying the icon together with the text string describing the function, even the user who is not familiar with dealing with the information device can easily understand the function corresponding to the icon.

It is conceivable to display a combination of the icon and the additional information on the upper screen 2. However, since the upper screen 2 is always exposed to the outside, the user frequently sees the upper screen 2. For this reason, there are many users who desire to have information with the highest reference frequency such as a clock or a calendar to always be displayed on the standby screen on the upper screen 2. Further, there are many users who desire to have image data be displayed as a background of the standby screen displayed on the upper screen 2 such that the image data is not hidden by the icons or the like. Thus, it is desirable to display the combination of the icon and the additional information which requires a relatively large display area on the lower screen 3 covered with the first housing 1A in the first form.

The mobile phone terminal 1 performs the controls such that an icon displayed on the upper screen 2 corresponds to an icon displayed on the lower screen 3 when the form of the mobile phone terminal 1 is switched from the second form to the first form as well as when the form of the mobile phone terminal 1 is switched from the first form to the second form. For example, it is assumed that when the mobile phone terminal 1 is in the state illustrated at step S13 of FIG. 3, the user performs a predetermined operation and adds an icon 23b and additional information 23c to the lower screen 3 at step S21.

The icon 23b is associated with a music replay function. The additional information 23c is information displayed in association with the icon 23b. In this case, a text string representing a function associated with the icon 23b is displayed. When the tap gesture of tapping the icon 23b or the additional information 23c is performed, the mobile phone terminal 1 activates the music replay function.

It is assumed that after the icon 23b and the additional information 23c are added to the lower screen 3, the user switches the form of the mobile phone terminal 1 from the second form to the first form at step S22. In this case, since an icon corresponding to the icon 23b and the additional information 23c is not arranged on the standby screen displayed on the upper screen 2, the mobile phone terminal 1 adds an icon 23a corresponding to the icon 23b and the additional information 23c to the upper screen 2.

By performing the above control, even when the form of the mobile phone terminal 1 is switched from the second form to the first form and so the lower screen 3 is covered with the first housing 1A, the user can activate a function corresponding to an icon arranged on the lower screen 3 even on the upper screen 2.

Next, a process executed by the mobile phone terminal 1 according to a drag gesture between the upper and lower screens will be described with reference to FIGS. 5 to 9. A "drag" or "dragging" gesture is a gesture of touching a touch panel or a touch sensor, e.g., with a finger, and moving the finger along the touch panel or the touch sensor while keeping the finger touched thereon.

Figure 5:
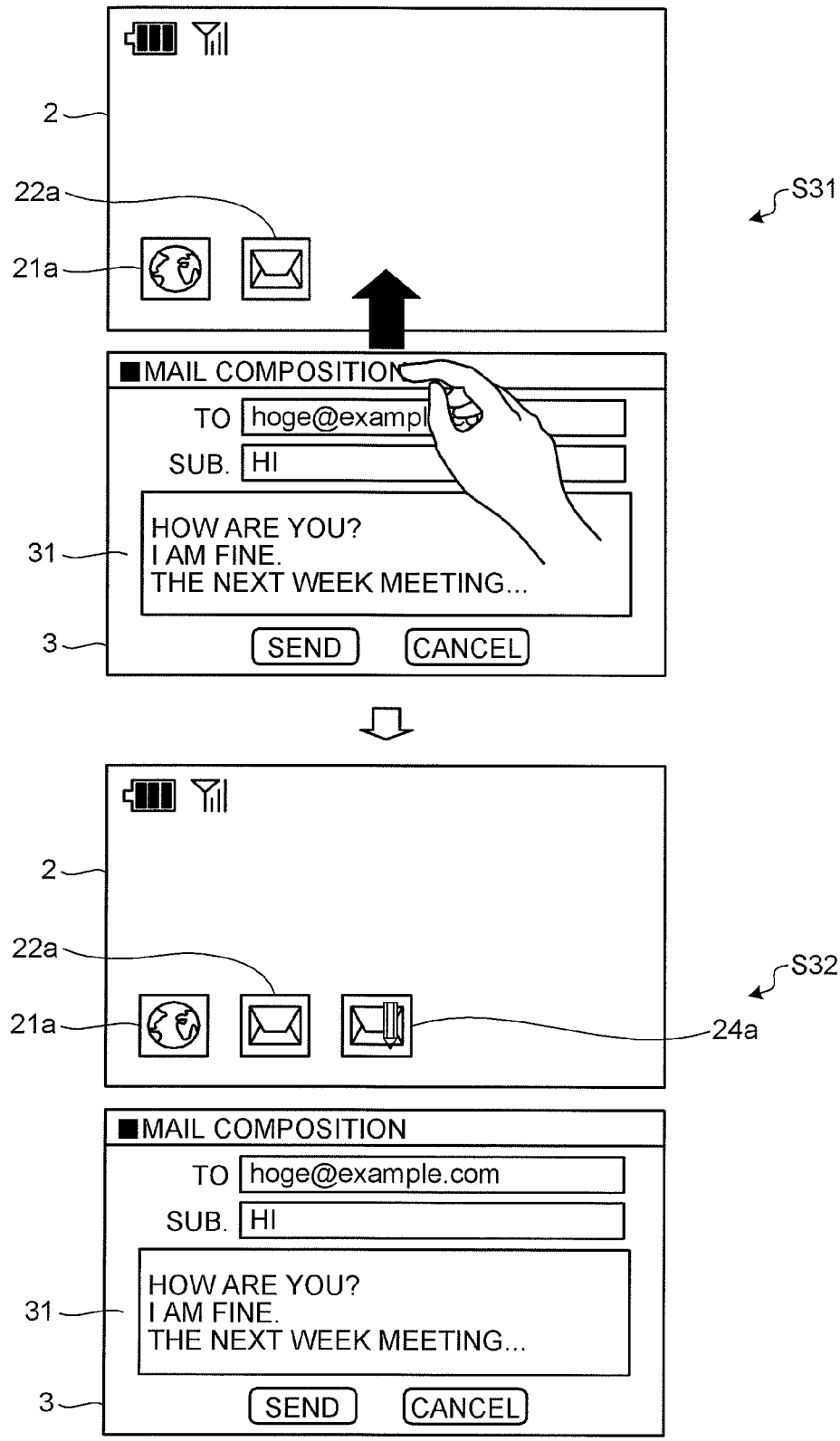
FIG. 5 is a diagram illustrating an example of adding an icon to an upper screen by a drag gesture of dragging a frame portion of a function screen.
Figure 6:
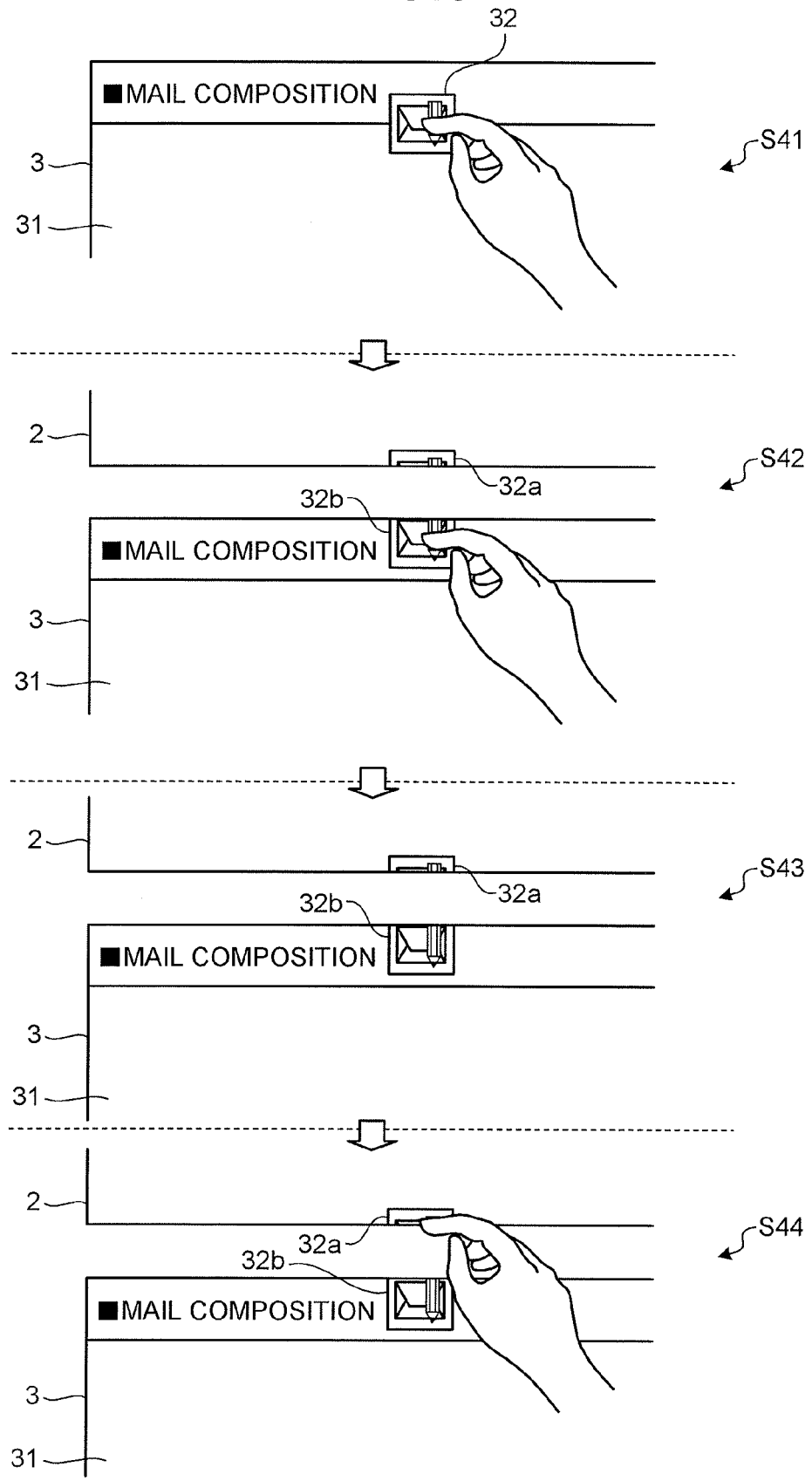
FIG. 6 is a diagram illustrating an example of a drag gesture between the upper and lower screens.
Figure 7:
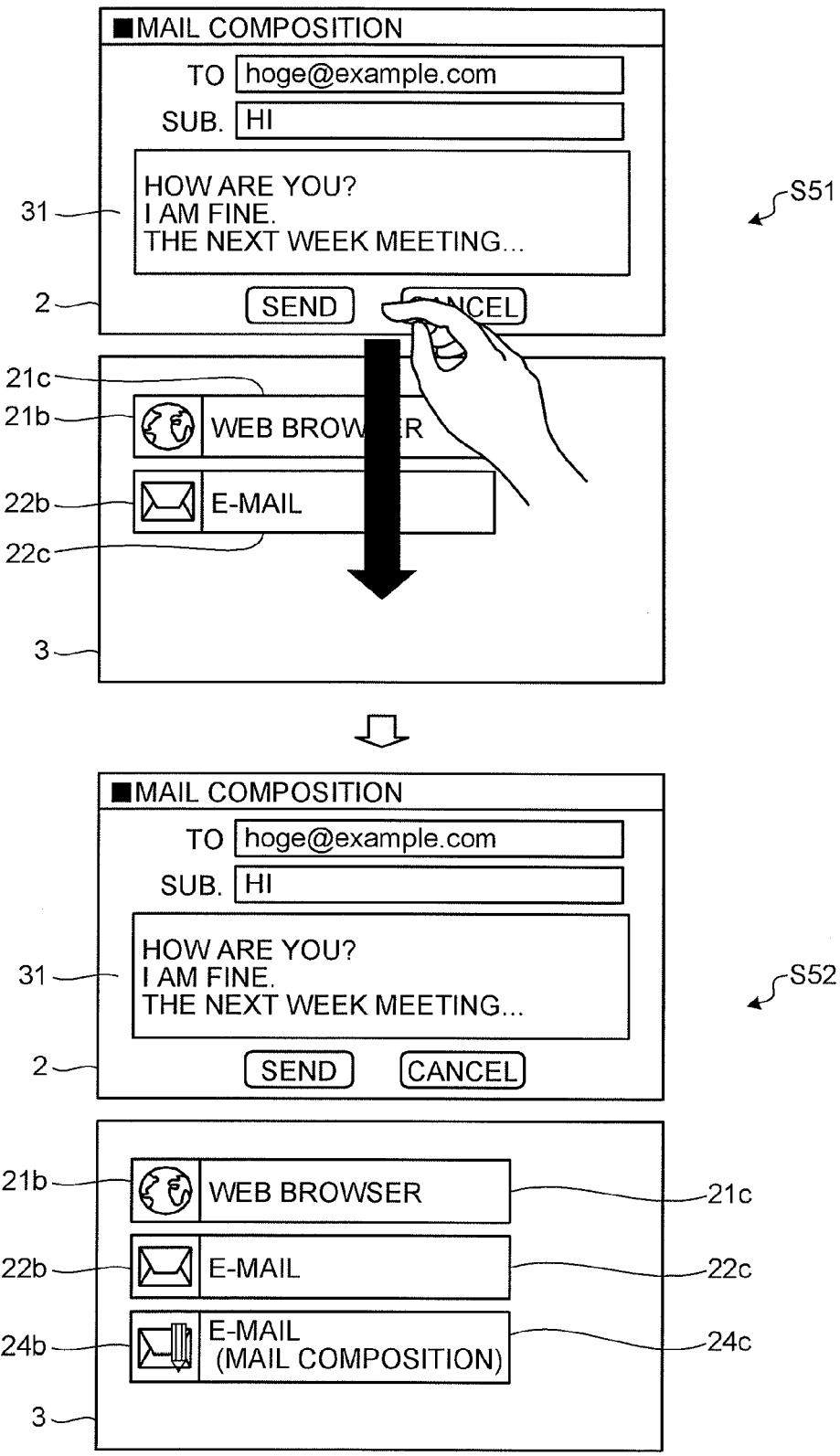
FIG. 7 is a diagram illustrating an example of adding an icon and additional information to a lower screen by a drag gesture of dragging a frame portion of a functional screen.
Figure 8:
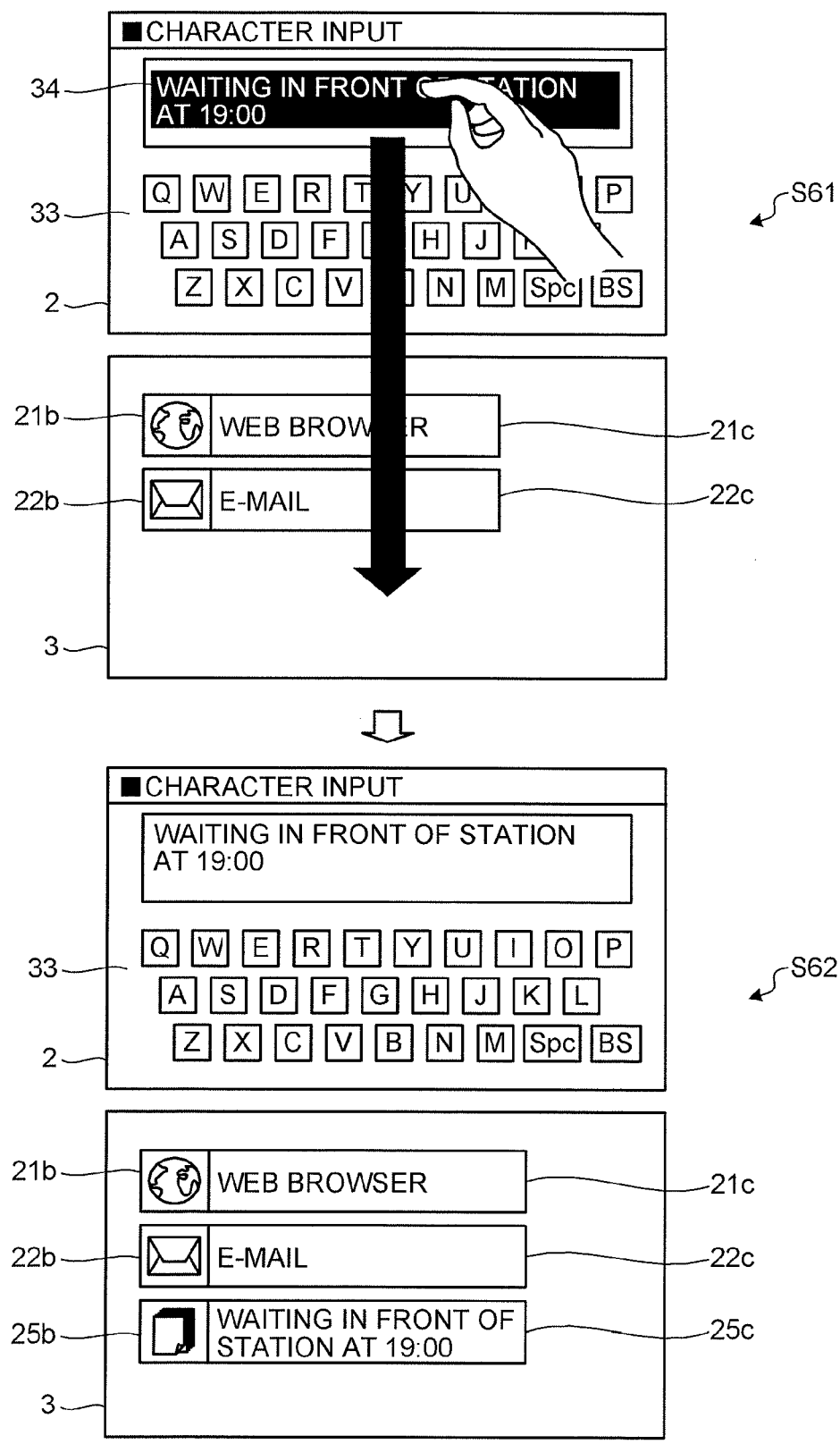
FIG. 8 is a diagram illustrating an example of adding an icon and additional information to a lower screen by a drag gesture of dragging a text string.
Figure 9:
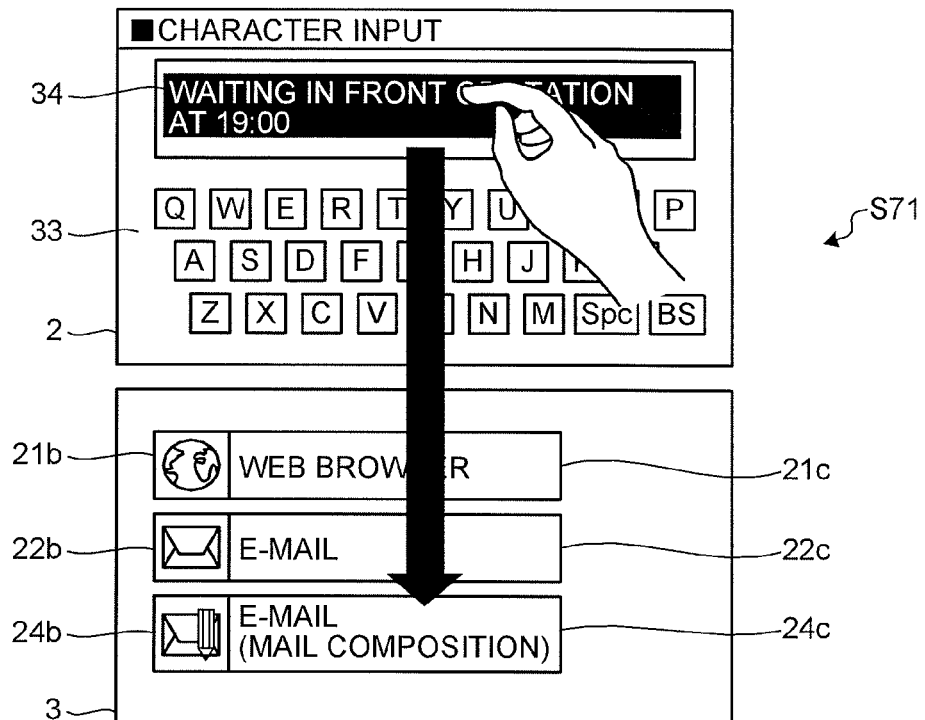
FIG. 9 is a diagram illustrating an example of activating a function in a lower screen by a drag gesture of dragging a text string.
Figure 9:
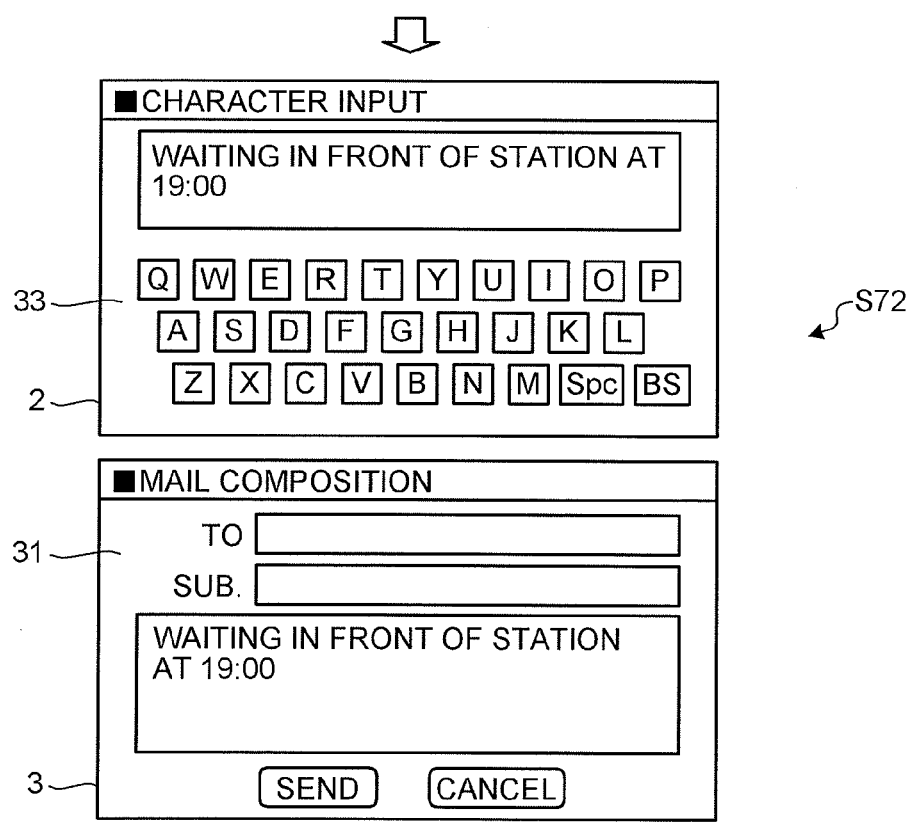

FIG. 5 is a diagram illustrating an example of adding an icon to the upper screen 2 by a drag gesture of dragging a frame portion of a function screen. FIG. 6 is a diagram illustrating an example of a drag gesture between the upper and lower screens. FIG. 7 is a diagram illustrating an example of adding an icon and additional information to the lower screen 3 by a drag gesture of dragging a frame portion of a functional screen. FIG. 8 is a diagram illustrating an example of adding an icon and additional information to the lower screen 3 by a drag gesture of dragging a text string. FIG. 9 is a diagram illustrating an example of activating a function in the lower screen 3 by a drag gesture of dragging a text string.

The user can add an icon even by a drag gesture of dragging a frame portion of a functional screen between the upper and lower screens instead of the above described system using the menu. Here, the "functional screen" refers to a screen, displayed on the upper screen 2 or the lower screen 3, which allows a function activated by tapping an icon or the like to display information and/or request an input of information. The "frame portion" refers to a portion of the functional screen excluding a portion, in which specific processing is executed according to the user's operation, like a button or a check box. For example, the frame portion is a title bar portion.

For example, it is assumed that at step S31 of FIG. 5 the user activates the E-mail function and then composes an e-mail on the lower screen 3. At this time, when the user puts his/her finger on a frame portion of a mail composition screen 31 and performs a drag gesture of dragging the frame portion of the mail composition screen 31 up to the upper screen 2, the mobile phone terminal 1 adds an icon 24a to the upper screen 2 at step S32.

The icon 24a is associated with the mail composition function of the E-mail function. When the tap gesture of tapping the icon 24a is performed, the mobile phone terminal 1 displays the mail composition screen 31 by activating the mail composing function rather than another function included in the E-mail function such as a mail viewing function.

As described above, when the user is using a specific functional screen and desires to frequently use the corresponding functional screen later, by performing the drag gesture of dragging the frame portion of the functional screen between the upper and lower screens, an icon for activating the corresponding functional screen can be easily created.

Here, an example of the drag gesture between the upper and lower screens will be described in detail with reference to FIG. 6. When the user puts his/her finger on the frame portion of the mail composition screen 31 at step S41 of FIG. 6, the mobile phone terminal 1 displays an icon 32 on a portion on which the user's finger is placed. For example, the icon 32 has the same external appearance as the icon 24a corresponding to the mail composing function.

Subsequently, when the user moves his/her finger in the direction toward the upper screen 2 while the finger is kept in contact with the lower screen 3, the mobile phone terminal 1 moves the icon 32 along the finger's movement. Then, at step S42, when the user continuously moves the finger, a part of the icon 32 protrudes from the lower screen 3, and only an icon piece 32b is displayed on the lower screen 3. In this case, the mobile phone terminal 1 displays an icon piece 32a that is a protruding portion of the icon 32 at a location on the upper screen 2 closest to the icon piece 32b.

When the icon is divided and displayed on the upper screen 2 and the lower screen 3 as described above, the mobile phone terminal 1 continuously displays the divided icon during a predetermined time period (for example, for several seconds) even though the user releases the finger from the lower screen 3 at step S43. Then, at step S44, when the user puts the finger on the icon piece 32a in advance and moves the finger in an upward direction in the drawing while maintaining the contact with the upper screen 2, the ratio of the icon piece 32a to the icon piece 32b is increased, and eventually the entire icon 32 is displayed on the upper screen 2.

FIG. 5 shows an example of the drag gesture from the lower screen 3 to the upper screen 2, but a combination of an icon and additional information may be added to the lower screen 3 by the drag gesture of dragging the frame portion of the functional screen from the upper screen 2 to the lower screen 3. For example, it is assumed that the user activates the E-mail function in the upper screen 2 and then composes a mail at step S51 of FIG. 7. At this time, when the user puts the finger on the frame portion of the mail composition screen 31 and performs the drag gesture of dragging up to the lower screen 3, the mobile phone terminal 1 adds an icon 24b and additional information 24c to the lower screen 3 in association with each other at step S52.

The icon 24b is associated with the mail composing function of the E-mail function. The additional information 24c is information displayed in association with the icon 24b. In this case, a text string representing a function associated with the icon 24b is displayed. When the tap gesture of tapping the icon 24b or the additional information 24c is performed, the mobile phone terminal 1 activates the mail composing function rather than another function included in the E-mail function such as the mail viewing function.

The user can add an icon not only by performing the drag gesture of dragging the frame portion of the functional screen but also by performing the drag gesture of dragging the text string between the upper and lower screens. For example, it is assumed that the user is inputting a text string on a character input screen 33 displayed on the upper screen 2 at step S61 of FIG. 8. The character input screen 33 is a screen that is activated from the standby screen displayed on the upper screen 2 when the user desires to input some information.

Then, when the user selects a text string 34 that is being input on the character input screen 33, places the user's finger on the selected text string 34, and performs the drag gesture toward a background portion of the lower screen 3, the mobile phone terminal 1 stores the text string 34 as data managed by a memo function. Then, the mobile phone terminal 1 adds an icon 25b and additional information 25c in association with each other at step S62, to the lower screen 3. The "memo function" refers to a function for editing an arbitrary text string and storing the edited text string. The "background portion" refers to a portion on which neither an icon nor additional information is displayed.

The icon 25b is associated with the memo function. The additional information 25c is information displayed in association with the icon 25b. In this case, the text string 34 managed by the memo function is displayed. When the tap gesture of tapping the icon 25b or the additional information 25c is performed, the mobile phone terminal 1 activates the memo function and causes the text string 34 to be displayed in an editable state.

The example of dragging the text string input on the character input screen 33 to the lower screen 3 has been illustrated in FIG. 8, but a text string on a screen other than the character input screen 33 may be dragged to the lower screen 3. For example, when a part of text string displayed on a reference screen of an E-mail is selected and dragged to the background portion of the lower screen 3, the mobile phone terminal 1 stores the selected text string as data managed by the memo function and displays the selected text string as additional information together with an icon associated with the memo function.

As described above, by dragging the text string that is being displayed or edited on one of the upper screen 2 or the lower screen 3 to the other, the user can cause the text string to be constantly displayed on the screen. This operation may be performed without hiding the functional screen on which the text string is being displayed or edited, and thus increases the user's convenience.

The text string may be dragged to an icon or additional information. For example, at step S71 of FIG. 9, the user is inputting a text string on the character input screen 33 displayed on the upper screen 2. At this time, it is assumed that the user selects the text string 34 that is being input on the character input screen 33, places their finger on the selected text string 34, and performs the drag gesture of dragging the text string 34 to the icon 24b or the additional information 24c on the lower screen 3.

When the drag gesture of dragging the text string to the icon or the additional information is performed, the mobile phone terminal 1 activates a function corresponding to the icon or the like in a state in which the dragged text string is input. At step S72 of FIG. 9, since the icon 24b is associated with the mail composing function, the mobile phone terminal 1 displays the mail composition screen 31 through the mail composing function in a state in which the text string 34 is input.

As described above, by dragging the text string that is being displayed or edited on one of the upper screen 2 or the lower screen 3 to the icon or the like displayed on the other, the user can activate the function corresponding to the icon or the like in the state in which the text string is input. This operation can be performed without hiding the functional screen on which the text string is being displayed or edited and without requiring the text string to be re-input, thereby improving the user's convenience.

Figure 10:
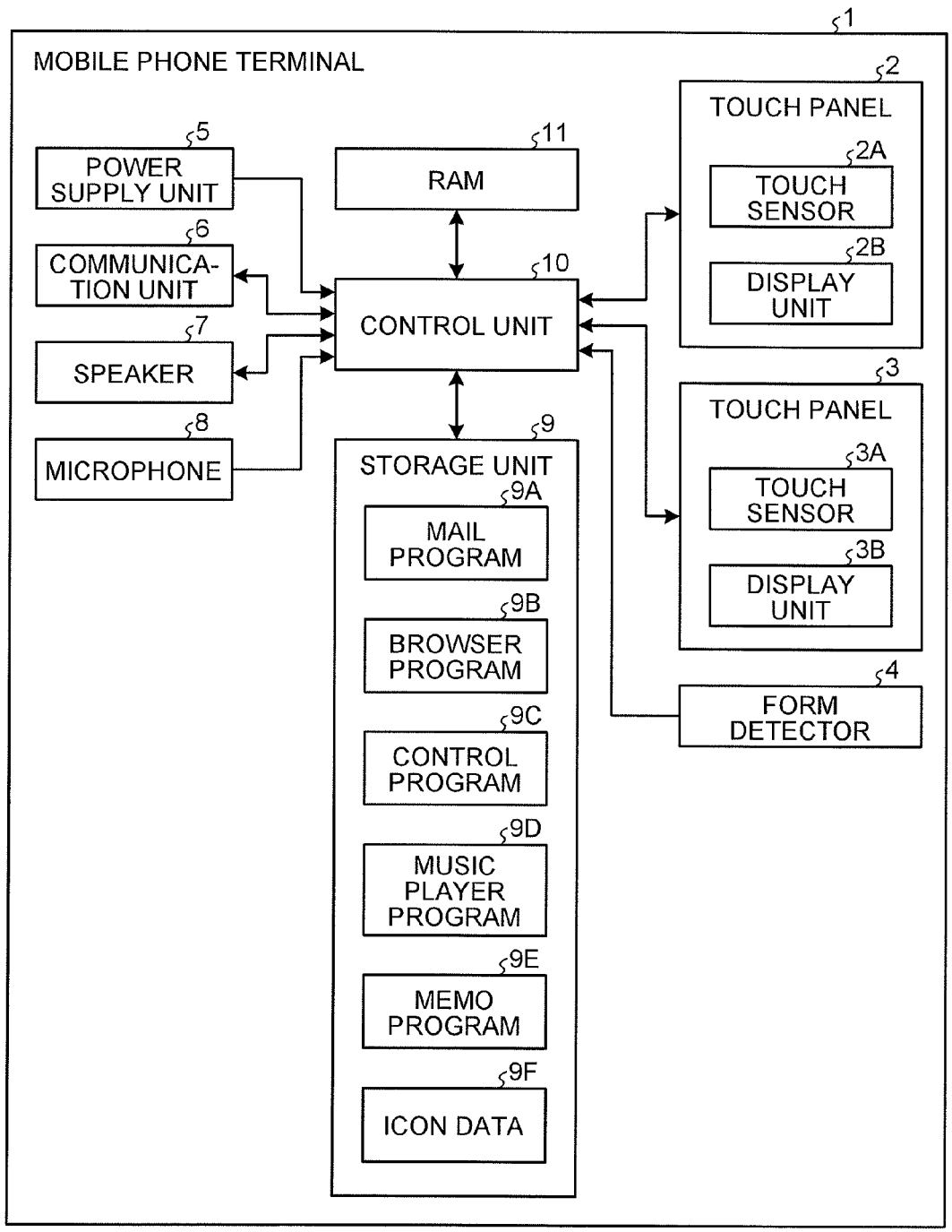
FIG. 10 is a block diagram illustrating a configuration of a mobile phone terminal.

Next, a configuration of the mobile phone terminal 1 will be explained below with reference to FIG. 10. FIG. 10 is a block diagram illustrating a configuration of the mobile phone terminal 1. The mobile phone terminal 1 includes the touch panel 2, the touch panel 3, a form detector 4, a power supply unit 5, a communication unit 6, a speaker 7, a microphone 8, a storage unit 9, a control unit 10, and a random access memory (RAM) 11. Each of the components may be provided in either one of the first housing 1A and the second housing 1B except that the touch panel 2 is provided on the first housing 1A and the touch panel 3 is provided on the second housing 1B.

The touch panel 2 includes a display unit 2B and a touch sensor 2A installed to be superimposed on the display unit 2B. The touch panel 3 includes a display unit 3B and a touch sensor 3A installed to be superimposed on the display unit 3B. Each of the touch sensor 2A and the touch sensor 3A detects various kinds of gestures performed on the surface with a finger as well as a position where the gesture is performed. Examples of the gesture detected by the touch sensor 2A and the touch sensor 3A include a single tap gesture, a double tap gesture, a long tap gesture, a drag gesture, and the like. The display unit 2B and the display unit 3B are each configured with, for example, a liquid crystal display (LCD) device or an organic electro-luminescence (EL) panel and displays a character, a diagram, an image, and the like.

The form detector 4 detects whether the mobile phone terminal 1 is in the first form or in the second form. The form detector 4 detects a form of the mobile phone terminal 1 using, for example, mechanical and/or electrical switches provided on faces of the first housing 1A and the second housing 1B that face each other.

The power supply unit 5 supplies electric power obtained from a battery or an external power supply to each of function units of the mobile phone terminal 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs speech of the other party on the telephone communication, a ring tone, or the like. The microphone 8 converts the speech of the user or other captured sounds to electrical signals.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.).

The storage unit 9 stores therein program (s) and data used for processing by the control unit 10. Specifically, the storage unit 9 stores a mail program 9A for implementing the E-mail function, a web browser program 9B for implementing the web browsing function, a control program 9C for implementing control of the above described functions, a music player program 9D for implementing the music replay function, a memo program 9E for implementing the memo function, and icon data 9F storing information related to the icon or the additional information arranged on the screen. In addition, the storage unit 9 stores an operating system (OS) program for implementing the basic function of the mobile phone terminal 1, or other programs or data such as address book data in which names, telephone numbers, mail addresses, and the like are registered.

Here, the icon data 9F will be described with reference to FIG. 11. FIG. 11 is a diagram illustrating an example of the icon data 9F. As illustrated in FIG. 11, the icon data 9F includes items such as ID, Corresponding Function, Pictogram, Additional Information, and Display Location. An identification number of an icon is stored under the item ID. Information for specifying a function corresponding to the icon is stored under the item Corresponding Function. Information for specifying a pictogram (image) displayed as the icon is stored under the item Pictogram.

A text string used when additional information is displayed in association with the icon is stored under the item Additional Information. Information specifying a location of the upper screen 2 at which where the icon is displayed and information specifying a location of the lower screen 3 at which the icon is displayed are stored under the item Display Location. When an icon is displayed on either one of the upper screen 2 or the lower screen 3, an item corresponding to a screen on which an icon is not displayed becomes blank.

The control unit 10 is, for example, a central processing unit (CPU), and integrally controls the operations of the mobile phone terminal 1. Specifically, the control unit 10 executes the program (s) stored in the storage unit 9 while referring to the data stored in the storage unit 9 as necessary, and executes the various processes by controlling the touch panel 2 and/or touch panel 3, the communication unit 6, and the like. The control unit 10 loads the program stored in the storage unit 9 or the data acquired/generated/processed through execution of the processes to the RAM 11 that provides a temporary storage area, as required. The program executed by the control unit 10 and the data to be referred to may be downloaded from a server over wireless communication by the communication unit 6.

For example, the control unit 10 implements the E-mail function by executing the mail program 9A. As the control program 9C is executed, the control unit 10 performs the controls, for example, for adding an icon according to the user's operation or a change in the form of the mobile phone terminal 1.

Figure 12:
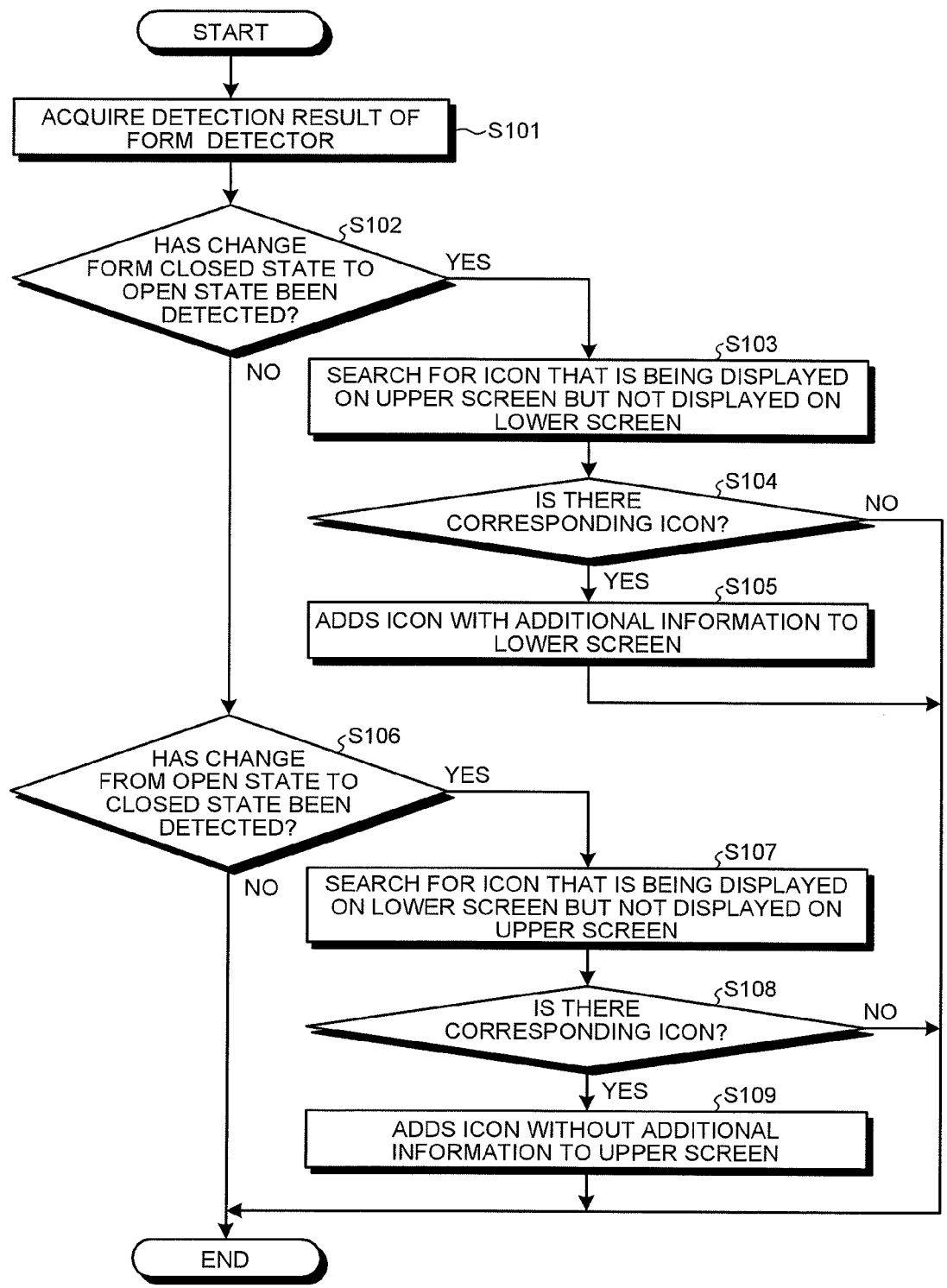
FIG. 12 is a flowchart illustrating a processing procedure when form of a mobile phone terminal changes.

Next, a processing procedure executed by the control unit 10 based on the control program 9C will be described with reference to FIGS. 12 and 13. A processing procedure illustrated in FIG. 12 is repetitively performed while the standby screens are displayed on the upper screen 2 and the lower screen 3. A processing procedure illustrated in FIG. 13 is repetitively performed while the standby screen is displayed on one of the upper screen 2 or the lower screen 3 and the functional screen is displayed on the other.

FIG. 12 is a flowchart illustrating a processing procedure when changing the form of the mobile phone terminal 1. As illustrated in FIG. 12, the control unit 10 acquires a detection result of the form detector 4 at step S101.

When a change from the first form to the second form, that is, a change from the closed state to the open state is detected by the form detector 4 (Yes at step S102), the control unit 10 searches for an icon that is being displayed on the upper screen 2 but not displayed on the lower screen 3 with reference to the icon data 9F at step S103. When there is no corresponding icon (No at step S104), the control unit 10 does not perform any processing.

When there is a corresponding icon (Yes at step S104), the control unit 10 adds an icon with additional information to the lower screen 3 at step S105. At this time, the control unit 10 stores information specifying a location of the lower screen 3 at which the icon is arranged under the item Display Location of a corresponding row of the icon data 9F.

Meanwhile, when a change from the second form to the first form, that is, a change from the open state to the closed state is detected by the form detector 4 (No at step S102 and Yes at step S106), the control unit 10 searches for an icon that is being displayed on the lower screen 3 but not displayed on the upper screen 2 with reference to the icon data 9F at step S107. When there is no corresponding icon (No at step S108), the control unit 10 does not perform any processing.

When there is a corresponding icon (Yes at step S108), the control unit 10 adds the icon without additional information to the upper screen 2 at step S109. At this time, the control unit 10 stores information specifying a location of the upper screen 2 at which the icon is arranged in the item Display Location of a corresponding row of the icon data 9F.

FIG. 13 is a flowchart illustrating a processing procedure when the drag gesture between the upper and lower screens is detected. As illustrated in FIG. 13, the control unit 10 acquires detection results of the touch panel (the upper screen) 2 and the touch panel (the lower screen) 3 at step S201. When no drag gesture between the upper and lower screens is detected (No at step S202), the control unit 10 does not perform any processing related on the drag gesture between the upper and lower screens.

When the drag gesture of dragging a text string between the upper and lower screens is detected (Yes at step S202 and Yes at step S203), the control unit 10 determines whether a drag destination is an icon or additional information at step S204. When the drag destination is an icon or additional information (Yes at step S204), the control unit 10 activates a function corresponding to the icon or the like of the drag destination on the same screen as the icon or the like in a state in which the dragged text string is input (displayed) in a functional screen at step S205.

When the drag destination is the background portion (No at step S204), the control unit 10 determines whether the drag destination is the lower screen 3 at step S206. When the drag destination is the lower screen 3 (Yes at step S206), the control unit 10 adds data in which the dragged text string is stored under the item Additional Information and information specifying the memo function is stored under the item Corresponding Function to the icon data 9F. Then, according to the data added herein, the control unit 10 adds an icon associated with the memo function together with additional information including the dragged text string to the lower screen 3 at step S207.

Meanwhile, when the drag destination is the upper screen 2 (No at step S206), the control unit 10 adds data in which the dragged text string is stored under the item Additional Information and information specifying the memo function is stored under the item Corresponding Function to the icon data 9F. Then, according to the data added herein, the control unit 10 adds an icon associated with the memo function without additional information to the upper screen 2 at step S208.

When the drag gesture of dragging the frame portion of the functional screen between the upper and lower screens is detected (No at step S203 and Yes at step S209), the control unit 10 determines whether the drag destination is the lower screen 3 at step S210. When the drag destination is the lower screen 3 (Yes at step S210), the control unit adds data in which a text string representing a function of the functional screen of the drag source is stored under the item Additional Information and information specifying a function for displaying the functional screen of the drag source is stored under the item Corresponding Function to the icon data 9F. Then, according to the data added herein, the control unit 10 adds an icon associated with the function for displaying the functional screen of the drag source together with additional information including the text string representing a function of the functional screen of the drag source to the lower screen 3 at step S211.

When the drag destination is the upper screen 2 (No at step S210), the control unit 10 adds data in which a text string representing a function of the functional screen of the drag source is stored under the item Additional Information and information specifying a function for displaying the functional screen of the drag source is stored under the item Corresponding Function to the icon data 9F. Then, according to the data added herein, the control unit 10 adds an icon associated with the function for displaying the functional screen of the drag source without additional information to the upper screen 2 at step S212.

When a dragged object of the drag gesture between the upper and lower screens is neither the text string nor the frame portion of the functional screen (No at step S209), the control unit 10 does not perform processing related to the drag gesture between the upper and lower screens.

As described above, in the present embodiment, processing, for example, of adding the icon is performed according to a change in the form of the mobile phone terminal 1 or according to the drag gesture between the screens, and thus the user's convenience may improve.

The aspects of the embodiments can be arbitrarily changed without departing from the spirit and the scope of the present invention. For example, the control program 9C may be separated into a plurality of modules or may be integrated with other programs.

The embodiment is configured that the mobile phone terminal 1 changes from the first form to the second form due to relative sliding of the first housing 1A and the second housing 1B. However, the change from the first form to the second form may be implemented by any operation other than the sliding operation. For example, the mobile phone terminal 1 may be a flip phone type terminal that couples the first housing 1A and the second housing 1B by a two-axis rotating hinge. In this case, by relatively rotating the first housing 1A and the second housing 1B around any one or both of the two axes of the hinge as a rotation axis, the mobile phone terminal 1 changes from one form to another. In some embodiments, the housings of the mobile phone terminal are coupled by a hinge or hinges that define(s) more than two axes of rotation.

In the above embodiment, the icon on the upper screen 2 has the same external appearance as the icon on the lower screen 3 corresponding to the icon. However, the corresponding icon may have a different external appearance as long as a correspondence between the two icons is clear by color, shape, location, or the like.

In the above embodiment, the icon or the like is added by the drag gesture of dragging the frame portion of the functional screen. However, the icon or the like may be added by a flick gesture of flicking the frame portion of the functional screen. The "flick" gesture refers to a gesture of touching a touch panel or a touch sensor, e.g., with a finger, and rapidly moving the finger as if to flick something. For example, when the flick gesture is performed in a direction of the upper screen 2 in the title bard portion of the mail sending screen in a state in which the mail sending screen is displayed on the lower screen 3, an icon for displaying the mail sending screen may be added to the upper screen 2 present in the direction in which the flick gesture is performed.

In the above embodiment, the frame portion of the functional screen is a dragged object of the drag gesture, however, a portion other than the frame portion may be a dragged object of the drag gesture. For example, a button of the functional screen may be a dragged object of the drag gesture. When a normal tap gesture of tapping the button is performed, processing associated with the button may be executed, and when a long tap gesture is performed, a drag gesture standby state may be invoked.

In the above embodiment, when the drag destination of the text string dragged between the upper and lower screens is the background portion, an icon associated with the memo function is added, however, an icon associated with any other function may also be added.

A function associated with an icon to add may be decided according to the type of a text string. For example, when the type of dragged a text string represents a telephone number, an icon associated with a call originating function may be added. In this technique, when the type of dragged a text string represents a mail address, an icon associated with the mail sending function may be added. Further, when the type of a dragged text string represents a uniform resource locator (URL), an icon associated with the web browsing function may be added.

Then, when the icon associated with the call originating function is tapped, a call may be originated using the dragged text string as a call designation number. When the icon associated with the mail sending function is tapped, the mail sending screen having the dragged text string as a transmission destination address may be displayed. Further, when the icon associated with the web browsing function is tapped, a web browser having the dragged text string as an address of an access destination may be displayed.

Alternatively, an icon associated with a certain function may be added by user's selection. For example, at timing when the drag gesture is completed and the finger is released from the touch panel, a list of activatable functions may be displayed, and the user may be allowed to decide which icon associated with a certain function is added from the list.

The advantages are that one embodiment of the invention provides a mobile electronic device, a control method, and a storage medium storing therein the control program capable of improving user's convenience.

What is claimed is:

1. A mobile electronic device, comprising:
   a first housing including a first display unit;
   a second housing including a second display unit;
   a form detector for detecting a first form in which the second display unit is covered with the first housing while the first display unit is exposed to the outside and a second form in which the first display unit and the second display unit are exposed to the outside; and
   a control unit for causing objects for activating a function to be displayed on the first display unit and on the second display unit in an associated manner in conjunction with a change in form detected by the form detector,
   wherein the control unit is configured to cause a first character string, which corresponds to a first icon displayed on the first display unit, to be displayed on the second display unit when a change from the first form to the second form is detected by the form detector,
   wherein the control unit is configured to cause the first icon, which corresponds to a second icon displayed on the second display unit in association with the first character string, to be displayed on the first display unit when a change from the second form to the first form is detected by the form detector,
   wherein the control unit is configured to cause, when a second character string displayed on the first display unit is dragged to the second icon displayed on the second display unit or the first character string corresponding to the second icon, a screen corresponding to the second icon to be displayed on the second display unit in a state in which the second character string is input.

2. A mobile electronic device, comprising:
   a first housing including a first display unit;
   a second housing including a second display unit;
   a form detector for detecting a first form in which the second display unit is covered with the first housing while the first display unit is exposed to the outside and a second form in which the first display unit and the second display unit are exposed to the outside; and
   a control unit for causing objects for activating a function to be displayed on the first display unit and on the second display unit in an associated manner in conjunction with a change in form detected by the form detector,
   wherein the control unit is configured to cause a first character string, which corresponds to a first icon displayed on the first display unit, to be displayed on the second display unit when a change from the first form to the second form is detected by the form detector,
   wherein the control unit is configured to cause the first icon, which corresponds to a second icon displayed on the second display unit in association with the first character string, to be displayed on the first display unit when a change from the second form to the first form is detected by the form detector,
   wherein the control unit is configured to cause, when a second character string displayed on the first display unit is dragged to a background portion of a standby screen displayed on the second display unit, the second icon to be displayed on the second display unit in association with the second character string which includes the first character string.

3. The mobile electronic device according to claim 2, wherein the control unit is configured to cause a list of functions to be displayed on the second display unit and to cause an icon, which corresponds to a function selected from the list of the functions, to be displayed on the second display unit as the second icon when the second character string is dragged to the background portion.

4. The mobile electronic device according to claim 2, wherein the control unit is configured to specify a function of performing processing using the second character string based on the type of the second character string and to cause an icon corresponding to the specified function to be displayed on the second display unit as the second icon when the second character string is dragged to the background portion.

\* \* \* \* \*